Patented Mar. 14, 1933

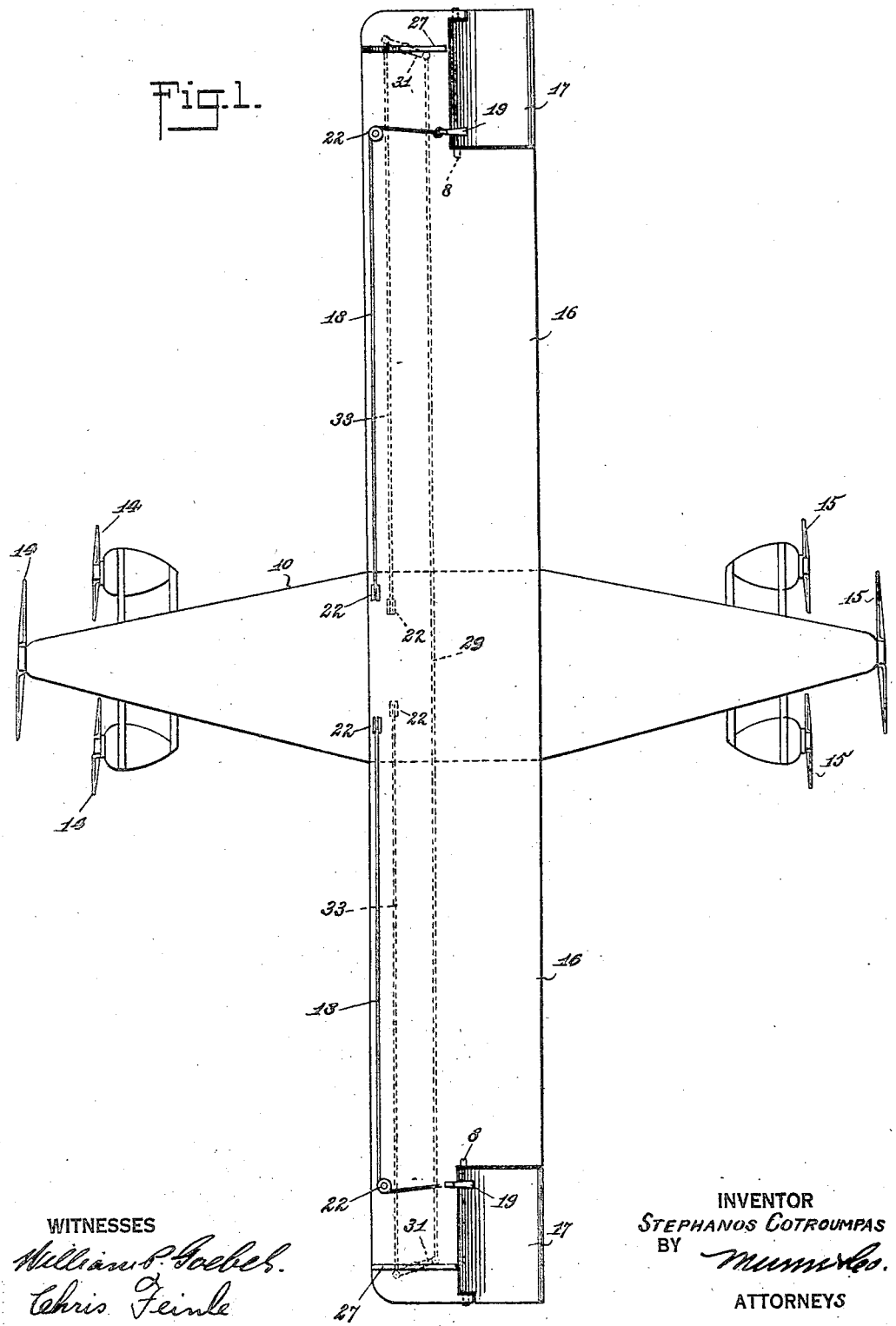

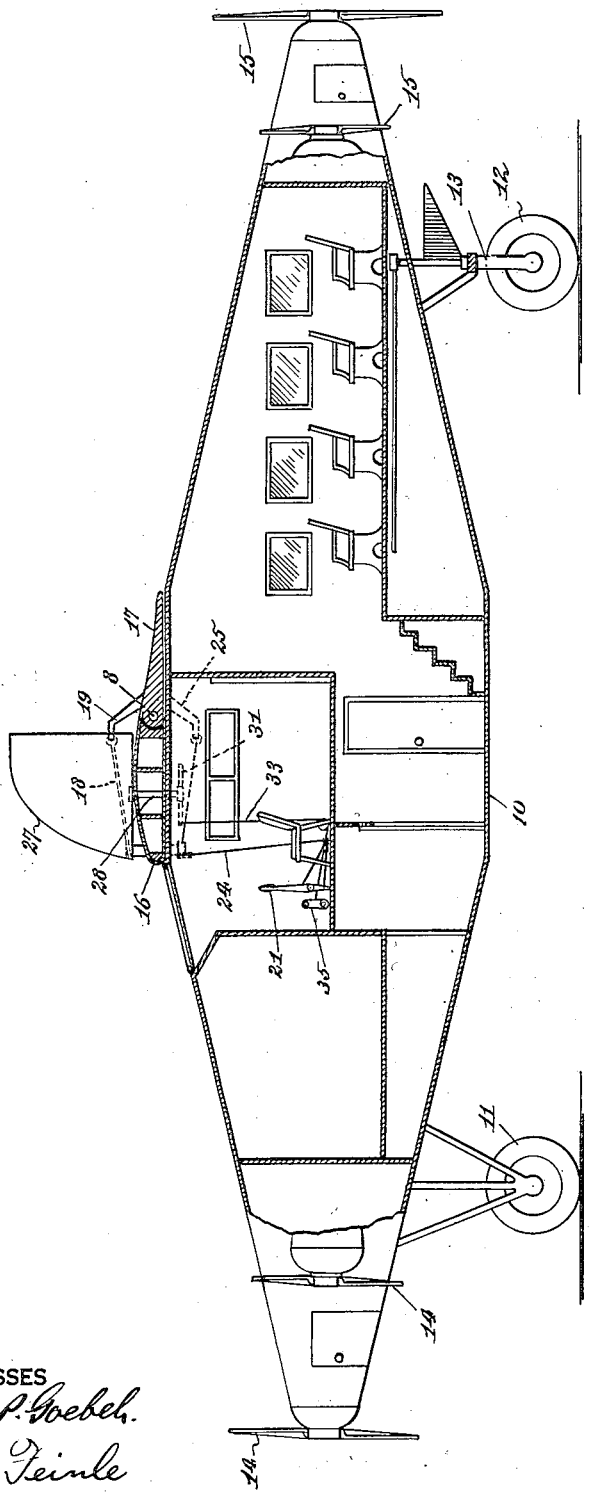

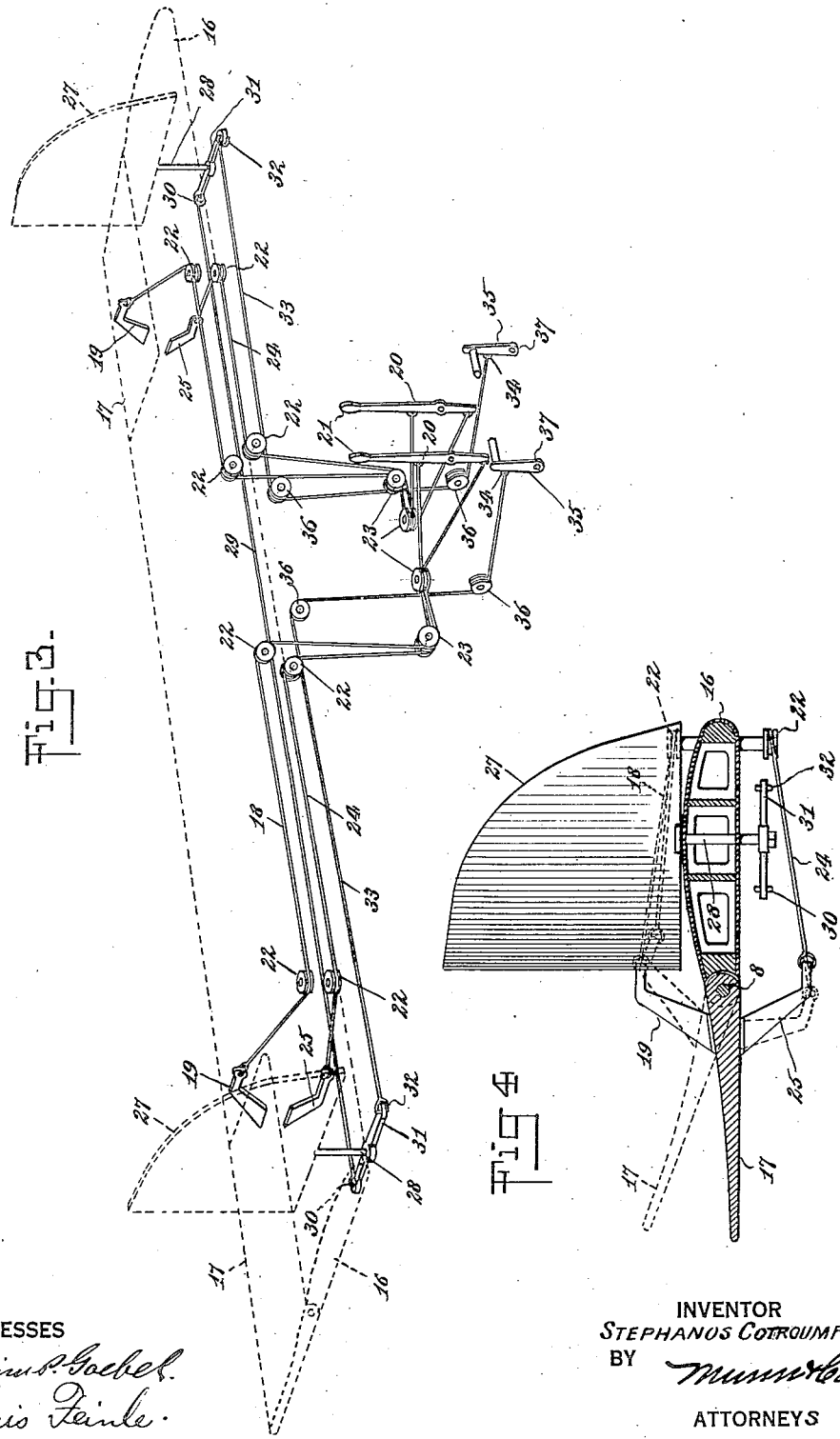

1,901,734

UNITED STATES PATENT OFFICE

STEPHANOS COTROUMPAS, OF BROOKLYN, NEW YORK, ASSIGNOR, BY MESNE ASSIGN-
MENTS, OF ONE-HALF TO CHARLES H. SULLIVAN, OF NORTHPORT, NEW YORK

AIRCRAFT

Application filed January 22, 1931, Serial No. 510,564. Renewed November 18, 1932.

This invention relates to control means for aircraft to control the direction of flight, the altitude, and to maintain the aerodynamic balance of an aircraft while in flight.

The invention has for its general object the provision of control means of the indicated character which will simplify the design of aircraft and which will be of efficient construction and operation.

The nature of the invention and its distinguishing features and advantages will appear when the following specification is read in connection with the accompanying drawings, in which Figure 1 is a plan view of an airplane having the features of the present invention;

Figure 2 is a longitudinal section and part elevation of the airplane;

Figure 3 is a diagrammatic view of the control means for the horizontal and vertical stabilizers;

Figure 4 is a profile section of one of the wings and associated horizontal and vertical stabilizers.

Referring now more particularly to the drawings, it will be apparent that there is shown a monoplane cabin-type of aircraft or airplane which is selected to illustrate the features of the invention. The aircraft shown includes a fuselage 10 of the cabin-type which is of streamline and symmetrical formation with respect to the longitudinal axis thereof, and tapers in opposite directions from the center thereof. The fuselage 10 is provided with a suitable landing gear 11 at the front including ground wheels, and a tail wheel 12 mounted for rotation in a fork 13 turnably mounted on the fuselage. The fuselage 10 has three engines arranged on the forward end thereof, in the present instance, and each drives a tractor propeller 14. The fuselage 10 also has three engines on the tail end thereof, in the present instance, each of which drives a pusher propeller 15. It is to be understood that the aircraft will be provided with known forms of control means for the purpose of controlling the operation of the engines, which control means has been omitted from the drawings for the sake of convenience and clearness. A main lifting plane or airfoil is secured in place on the fuselage 10 at the top center thereof and it extends transversely with respect to the fuselage to provide laterally disposed left and right wings 16.

In order to control the direction of flight, the altitude, and to maintain the balance of the aircraft while in flight there is provided means presently to be described, which performs in conjunction with the tractor and pusher propellers 14 and 15. An airfoil 17 is mounted for pivotal movement as at 8 on each wing 16 at the trailing edge and constitutes a section of the wing. Each airfoil 17 serves as an aileron and also has a horizontal stabilizer to control the roll and also the pitch of the craft, since it may be moved to different angles of incidence. Separate control means is provided for each of the airfoils 17 to operate to change the angle of incidence thereof. On reference to Figure 3 it will be apparent that each airfoil 17 is operated by a control wire 18 which has one end thereof connected with a horn 19 on the upper surface of the airfoil, and the opposite end of the wire is connected as at 20 with a service member in the form of a hand lever 21 arranged within the pilot's compartment in the fuselage. The connection 20 with the lever is made above the fulcrum of the lever. The wire 18 passes around guide pulleys 22 on the wing, and pulleys 23 on the fuselage. A control wire 24 has one end thereof connected with a horn 25 on the lower surface of the airfoil, and the opposite end of the wire is connected as at 26 with the lower extremity of the lever 21. It will now be apparent that when the lever 21 is moved forwardly the airfoil 17 will be swung on its pivot to an upwardly inclined position, and that when the lever 21 is pulled rearwardly the airfoil 17 will be swung on its pivot to a downwardly inclined position in relation to the wing. It will be further understood that means is provided to cause the airfoils or combination stabilizers and ailerons 17 to move in the same direction, or in opposite directions, to change the angles of incidence thereof for the purpose of controlling the roll and pitch of the craft.

In order to control the yaw of the craft there is provided an airfoil 27 on the top of each of the wings 16. Each airfoil 27 serves as a vertical stabilizer and rudder. Each airfoil 27 is mounted for pivotal movement on a vertical pivot 28 mounted on the related wing. Means is provided to operate the airfoils 27 to operate it to change the angles of incidence thereof. The means to operate the airfoils 27 in the present instance includes a wire 29 having its opposite ends connected respectively as at 30 with cross bars 31 secured respectively to the pivots 28. Each connection 30 is made with one end of the related bar 31. The opposite end of each bar 31 has connected thereto as at 32 one end of a control wire 33 whose opposite end is connected as at 34 with a service member 35 in the form of a pedal arranged within the pilot's compartment at one side of and in advance of one of the hand levers 21. Each wire 33 is passed around guide pulleys 36 carried by the fuselage 10. The connection 34 of the wire 33 with the pedal 35 is above its fulcrum 37. It will now be apparent that, when the left pedal 35 is moved forwardly, the airfoils 27 will be turned simultaneously to cause a right turn of the craft, and that, by moving the right pedal 35 forwardly, the airfoils 27 will be turned simultaneously to angles of incidence, causing a left turn of the craft. In other words, it will be apparent that the airfoils 27 serve to control the yawing movement of the craft about its normal axis and that they will operate in conjunction with the airfoils 17.

From the foregoing it will be apparent that the use of the usual rudder and horizontal stabilizers on the tail have been supplanted by the airfoils 17 and 27 which are arranged on the main lifting wings 16, thereby greatly simplifying the design of aircraft of the heavier-than-air types. It will also be apparent that by reason of the novel form of control means disclosed the aerodynamic balance of the craft may be maintained while the craft is in flight and that take-offs and landings may also be effected.

I claim:

1. In an airplane, in combination, a fuselage, laterally extending wings on the fuselage approximately at the top center thereof, and rudder and stabilizer fins mounted on said wings respectively for movement to different angles of incidence, and separate control means for each of said fins to operate it to change the angle of incidence thereof.

2. In an airplane, in combination, a fuselage, laterally extending wings on the fuselage approximately at the top center thereof, rudder and stabilizer fins mounted on said wings respectively for movement to different angles of incidence, separate control means for each of said fins to operate it to change the angle of incidence thereof, and means to control the pitch of the airplane.

3. In an airplane, in combination, a main lifting wing structure, means positioned on said structure adapted to be operated to control the roll and pitch of the airplane, means positioned on said structure adapted to be operated to control the yaw of the airplane, a fuselage on which said structure is mounted, a puller and pusher respectively on the nose and tail of said fuselage.

Signed at New York city in the county of Kings and State of New York this 16th day of December A. D. 1930.

STEPHANOS COTROUMPAS.